(12) United States Patent
Berg et al.

(10) Patent No.: US 11,855,853 B1
(45) Date of Patent: *Dec. 26, 2023

(54) MACHINE LEARNING ALGORITHMS FOR CHANGE MANAGEMENT IN INFORMATION TECHNOLOGY ENVIRONMENT

(71) Applicant: United Services Automobile Association (USAA), San Antonio, TX (US)

(72) Inventors: Donald Nelson Berg, Destin, FL (US); David Owens, Holly Springs, MS (US); James Austin Adams, San Antonio, TX (US); Thomas Alexander Hoffman, Grapevine, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,666

(22) Filed: Feb. 23, 2023

Related U.S. Application Data

(63) Continuation of application No. 17/083,823, filed on Oct. 29, 2020, now Pat. No. 11,616,700.

(60) Provisional application No. 62/927,234, filed on Oct. 29, 2019.

(51) Int. Cl.
| | |
|---|---|
| *H04L 41/16* | (2022.01) |
| *G06N 20/00* | (2019.01) |
| *H04L 41/0803* | (2022.01) |
| *G06F 8/71* | (2018.01) |
| *G06F 16/23* | (2019.01) |

(52) U.S. Cl.
CPC ............ *H04L 41/16* (2013.01); *G06F 8/71* (2013.01); *G06F 16/2379* (2019.01); *G06N 20/00* (2019.01); *H04L 41/0803* (2013.01)

(58) Field of Classification Search
CPC ....... H04L 41/16; H04L 41/0803; G06F 8/71; G06F 16/2379; G06N 20/00
See application file for complete search history.

(56) References Cited

U.S. PATENT DOCUMENTS

| | | | |
|---|---|---|---|
| 7,680,907 | B2 | 3/2010 | Zarenin et al. |
| 10,055,793 | B1 | 8/2018 | Call et al. |
| 11,004,135 | B1 | 5/2021 | Sandler et al. |
| 11,341,554 | B1 | 5/2022 | Sturm et al. |
| 2008/0263185 | A1* | 10/2008 | Anderson ............... H04W 4/02 709/220 |
| 2014/0101467 | A1* | 4/2014 | Jubran ................... H04L 41/344 709/224 |
| 2014/0201340 | A1* | 7/2014 | Barnhill .............. H04L 12/2809 709/220 |
| 2019/0296979 | A1 | 9/2019 | Gupta et al. |

(Continued)

*Primary Examiner* — Javier O Guzman
(74) *Attorney, Agent, or Firm* — Perkins Coie LLP

(57) ABSTRACT

An information technology (IT) network includes configuration items (CIs) that may constantly change, where the CIs describe hardware components or software components that are configured to operate on the IT network. Machine learning techniques can be employed determine whether a CI has been changed (e.g., added, updated, or removed) in the IT network. For example, a software code or a log message associated with a CI can be analyzed to determine whether the CI is a newly added or updated within the IT network.

20 Claims, 6 Drawing Sheets

(56) References Cited

U.S. PATENT DOCUMENTS

2020/0112489 A1 4/2020 Scherger et al.
2020/0143235 A1 5/2020 Seko et al.
2020/0410801 A1 12/2020 Rahilly et al.

* cited by examiner

MACHINE LEARNING ALGORITHMS FOR CHANGE MANAGEMENT IN INFORMATION TECHNOLOGY ENVIRONMENT

CROSS-REFERENCE TO RELATED APPLICATIONS

This application is a continuation of U.S. patent application Ser. No. 17/083,823, filed on Oct. 29, 2020, entitled "MACHINE LEARNING ALGORITHMS FOR CHANGE MANAGEMENT IN INFORMATION TECHNOLOGY ENVIRONMENT," which claims priority to U.S. Provisional Application No. 62/927,234, filed on Oct. 29, 2019, entitled "MACHINE LEARNING ALGORITHMS FOR CHANGE MANAGEMENT IN INFORMATION TECHNOLOGY ENVIRONMENT," both of which are hereby incorporated by reference in their entireties for all purposes.

TECHNICAL FIELD

This disclosure is directed generally to systems, methods, and apparatuses for detecting and managing changes to configuration files in an information technology environment.

BACKGROUND

An information technology (IT) network includes hardware and software components that are designed to provide users with information or content requested by the users. For example, applications operating on servers can allow a user to sign up for services or to perform a search via a web browser operating on the user's computer. In some cases, however, some of the hardware and software components in an IT network can malfunction or generate error messages that can prevent the IT network from providing information or content requested by users or from processing data as part of its normal operation. Engineers manage IT networks using monitoring software tools that alert the engineers of failure or issues with the hardware or software component, as well as new components introduced to the IT network.

Figure 1:
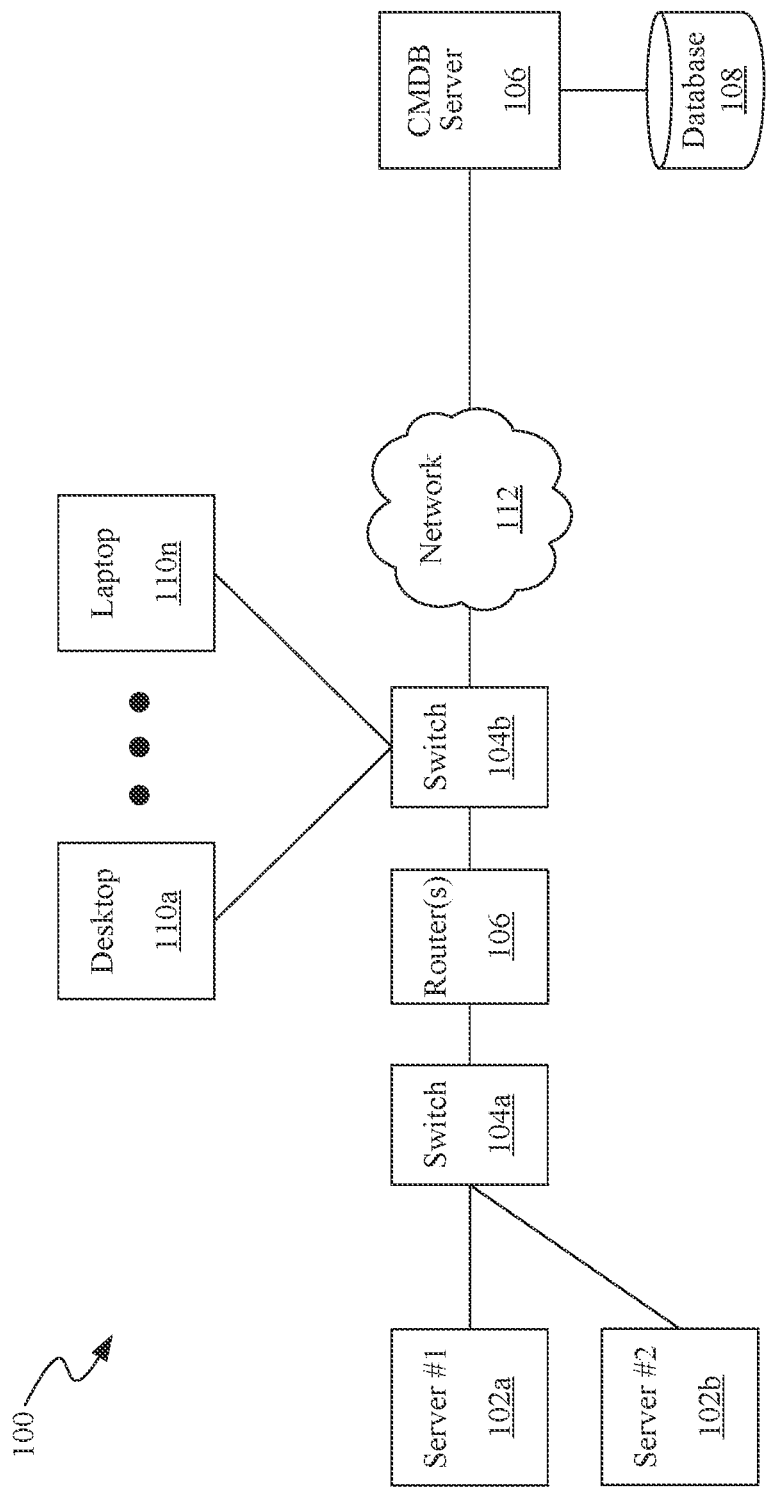
FIG. 1 shows an example system to track configuration items (CIs) in an information technology (IT) network.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A Configuration Management Database (CMDB) is used in an IT network to keep track of hardware and software components. The CMDB includes data known as configuration items (CI) that describes the hardware and/or software components operating in an IT network. For example, if a new CI such as a server or database or web service is added to an IT network, the health of the new CI can be monitored. For example, for a CI relating to a server, a monitoring software tool can monitor the server's CPU's utilization so that if the CPU utilization exceeds a pre-determined threshold value, the monitoring software tool can send an alert to an engineer managing the IT network. In another example, if a new CI such as a container or application or application program interface (API) is added to an IT network, the health of the new CI can be monitored. For example, for a CI relating to an API, a monitoring software tool can monitor the API utilization so that if excessive performance issues exceed a service level agreement (SLA), then the monitoring software tool can send a notification to one or more stakeholders managing that IT asset.

Conventional CMDB and monitoring software tools have several technical problems. One technical problem with conventional monitoring software tools is that they require significant configuration to operate with an IT network. In some cases, several monitoring software tools need to be configured to with the IT network and integrated with each other so that the IT network can be adequately maintained. A technical problem with conventional CMDB is that change discovery of a CI (e.g., adding, updating, or removing) is not proactive. For example, monitoring software can alert an administrator or engineer that it is not receiving readings from a particular CI, which requires the administer or engineer to review the issue, determine that a CI is no longer operable and should be removed from the CMDB, and make the change to the CMDB. Another technical problem with convention CMDB and monitoring software tools that is there are too many changes occurring with CIs in the IT network which makes it difficult for conventional CMDB to effectively track and manage the CIs.

To overcome at least some of these technical problems, this patent document describes techniques to track and update CIs in an IT network. This patent document first provides an overview of the IT network within which the CIs can be tracked. The techniques can track changes associated with CI, such as adding a CI to the IT network as further described in Section I, updating the CI in the IT network as further described in Section II, and removing the CI from the IT network as further described in Section III. In some embodiments, machine learning techniques can be employed to track changes associated with a CI. For example, software code or a log message associated with a CI can be analyzed to determine whether the CI is a newly added or updated within the IT network.

FIG. 1 shows a system 100 to track CIs in an IT network or computing network. The system 100 includes an IT network comprising servers 102a, 102b and computers 110a-110n in communication with the CMDB server 106 via one or more switches 104*a*, 104*b* and/or one or more routers 106. The database 108 (i.e., CMDB) stores the CIs. CIs can include hardware or software components, such as servers, databases, web services, laptops, networking devices (e.g., router, switch), phones, and/or virtual machines (e.g., Java virtual machine (JVM)). The different types of CIs can be organized by classes. For example, servers may be classified in a server class, routers and switches may be classified in a networking class, and web services may be classified in a web service class. Thus, the database 108 can include a list of the CIs along with their corresponding classes. A hardware or software component can have more than one CI associated with it. As further described in this patent document, the techniques to track CIs can be performed by a configuration management module (shown as FIG. 5) operating in a CMDB server 106.

The configuration management module of the CMDB server 106 can perform a discovery process to determine if changes were made to CIs within the IT network. The configuration management module can determine changes made with respect to a CI, such as determining that a CI is newly added to the IT network, or determining that a CI has been updated, or determining that a CI has been removed from the IT network. The configuration management module can determine changes made with respect to CI relationships, such as determining which other CI's are connected to or calling the current CI, or determining which CI's run within other CI's (like databases that may run on a server) or determining which CI's have dependencies on other CI's. The discovery process can update the CIs in the database 108 based on changes discovered for the CIs.

For example, a new CI may be a new JVM that was added to the IT network. In this example, the configuration management module can employ machine learning techniques to determine that the new CI is added to IT network. If a new CI has been discovered, the configuration management module sends a message to the database 108 to add the new CI to the database 108. In another example, the configuration management module can determine that a CI has been updated and then send a message to the database 108 to update a previous version of the CI stored within the database 108 with the updated CI. In yet another example, the configuration management module can determine that a CI has been removed from the IT network and send a message to the database 108 to remove the CI. The techniques for the discovery process to determine changes made to the CI (e.g., adding, updating, or removing CI) are further described in this patent document.

The configuration management module can use machine learning techniques to dynamically change key terms to look for in software code and log messages. The configuration management module may periodically scans log messages and committed software code looking for these key terms. The configuration management module can employ at least two techniques to detect changes associated with the CIs. In a first example technique, the configuration management module can scan the software code associated with the CI. The software code can be structured so that a machine learning algorithm can parse the actual base code looking for key terms associated with, for example, databases and or web services. The presence of one or more key terms within the software code can indicate changes made with respect to the CI and/or to the CI relationships. For example, the machine learning algorithm operating as part of the configuration management module can be trained to search for key terms with in the software code using RegEx that can extract the CI name, type of CI and/or the CI relationships.

The key terms with which the configuration management module parses from the software code can be determined by machine learning techniques, for example, based on training data provided to the configuration management module. In some embodiments, machine learning techniques can be stored in a storage device (e.g., hard drive) located within the CMDB server 106.

In a second technique, the configuration management module can periodically scan for a log message by querying the logs and looking for new messages or key terms that are coming through from new sources, e.g., from new CIs that have not been discovered before. Log messages can be received from various monitoring tools. The presence of key terms within the log message can indicate changes made with respect to the CI. If the configuration management module detects a new CI in a log message, the configuration management module can send the new CI to be added to the database 108. The key terms with which the configuration management module queries a log message can be determined by machine learning techniques, for example, based on training data provided to the configuration management module.

In some embodiments, the configuration management module can discover relationships between the CIs based on code is written. Code repository files can be scanned for key terms that indicate a relationship between two CI's. For example, code can contain database connection strings, message queue names and web-service methods, which can be used to create a relationship between the source code CI and the target CI. The configuration management module can import or send messages indicating the relationships and any new CIs into the database 108 (i.e., CMDB). When the configuration management module detects a change with a CI (e.g., a CI is added or updated or removed), the configuration management module can send a message to update the database 108.

In some embodiments, the configuration management module can perform the discovery process periodically (e.g., every 24-hours). For example, the configuration management module can periodically (every hour) query logs or logfiles looking for new error messages or metrics which can indicate a change to a CI. For example, the configuration management module can periodically (e.g., upon software commit event), query software repositories looking for changes in the code base, which can indicate new CI's or relationships. If the configuration management module detects changes, the raw files are scanned for specific CI type changes. Changes can be scanned for and categorized by type of change (e.g., create, update, delete, etc.). Changes can also be scanned for and categorized by CI type (e.g., error message, uniform resource identifier (URI), database, message queue, JVM, or Layer7 gateway). These changes are compiled by the configuration management module into an object used to update the database 108.

The example headings for the various sections below are used to facilitate the understanding of the disclosed subject matter and do not limit the scope of the claimed subject matter in any way. Accordingly, one or more features of one example section can be combined with one or more features of another example section.

I. CIs Added to an IT Network

Figure 2:
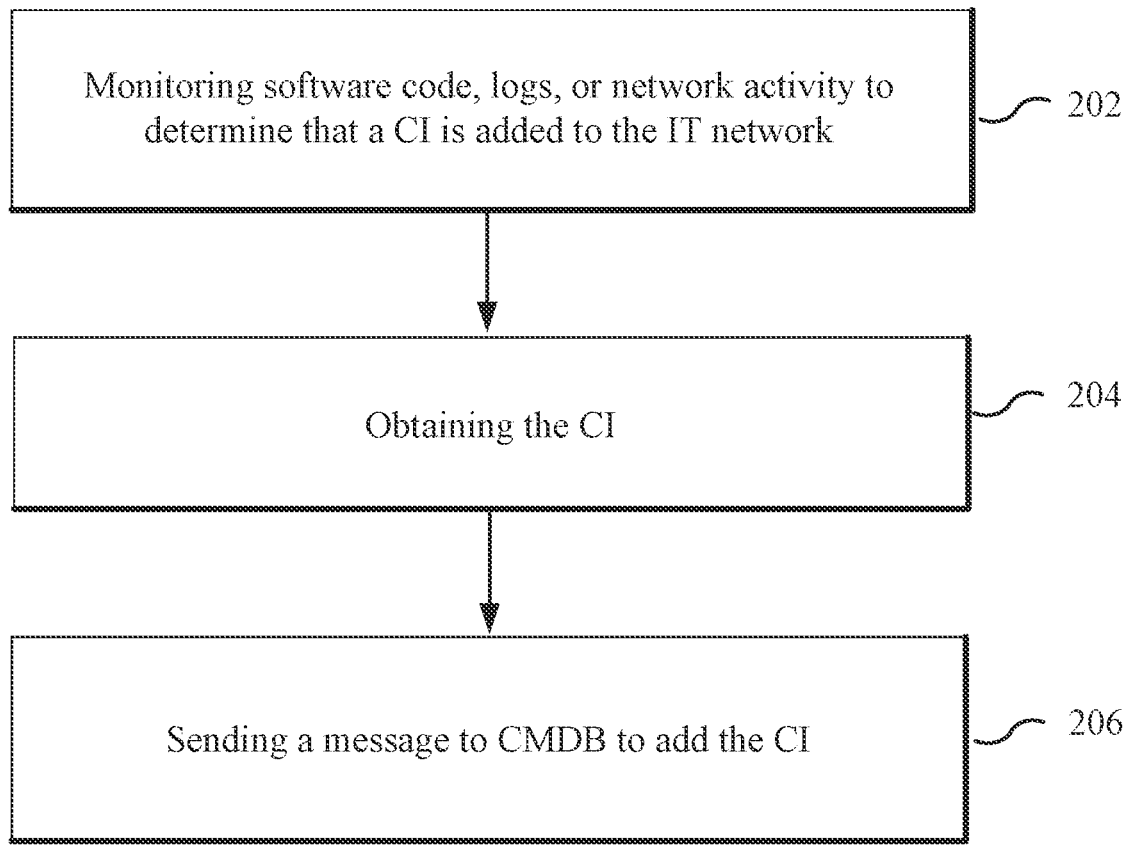
FIG. 2 shows an example discovery process performed by a configuration management module for a CI newly added to an IT network.

FIG. 2 shows an example of a discovery process performed by a configuration management module for a CI newly added to an IT network. At the monitoring operation 202, a configuration management module (included in the CMDB server 106 of FIG. 1) can monitor software code, logs or network activity associated with the CI to determine that the CI (e.g., a hardware component or a software component) has been added to the IT network. For example, the configuration management module may determine, using a machine learning model, that a CI is newly added and configured to operate in an IT network by parsing a software code or a log message associated with the CI and by identifying presence of one or more key terms within the software code or the log message. The presence of one or more key terms within the software code or the log message can indicate that the CI has been newly added. The machine learning model can provide the key term with which the configuration management module can parse the software code or the log message. In some embodiments, the machine learning model may provide key terms based on a type or class of CI.

Using machine learning models to identify key terms is a beneficial technical feature at least because key terms that may be relevant to one type of CI (e.g., servers) may not be as relevant to another type of CI (e.g., virtual machines). Furthermore, using machine learning models at the monitoring operation 202 is a beneficial technical feature at least because machine learning techniques can allow the configuration management module to identify changes made to the CIs that belong to several classes and/or to different systems. The machine learning model can constantly develop or refine the training set that includes the key terms with which the software code or the log message can be parsed or searched. In some embodiments, the training set can be organized by identifying one or more key terms for each type or class of CI. Thus, machine learning techniques can be beneficial to analyze different software codes or different log messages associated with different CIs.

In an example implementation, hardware or software sensors can be placed within the IT network to sense new CIs being added to the IT network. The hardware or software sensors can be part of the configuration management module. When a new CI is added to the IT network, the hardware or software sensor are triggered. The configuration management module can receive the trigger and perform the operations 204 to 206.

At the obtaining operation 204, the configuration management module can obtain the CI. At the sending operation 206, upon determining that the CI is newly added, the configuration management module sends a message to the CMDB to add or store within the CMDB the newly added CI.

II. CIs Updated in an IT Network

Figure 3:
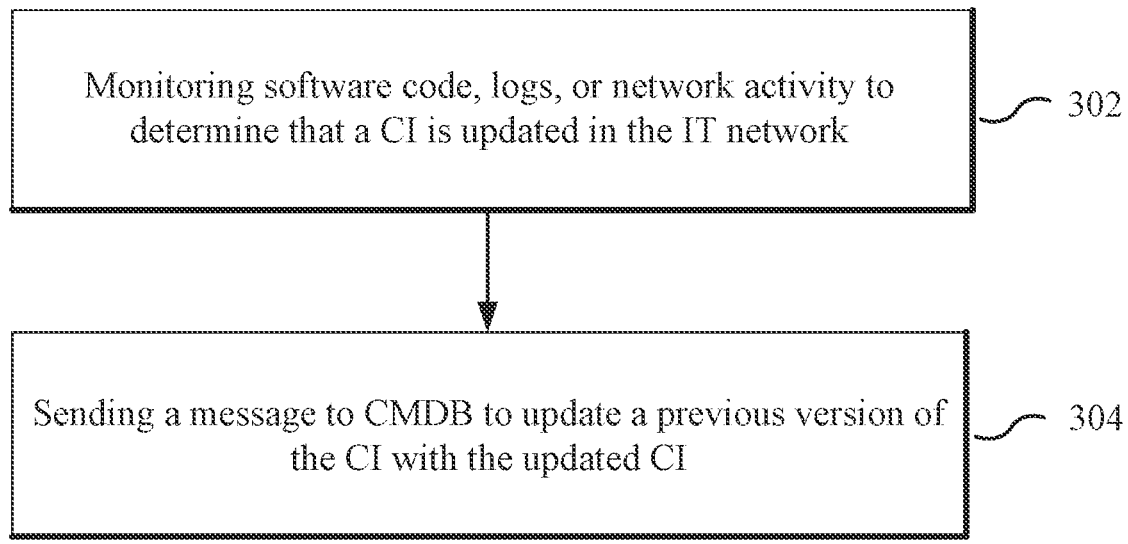
FIG. 3 shows an example discovery process performed by a configuration management module for an updated CI in an IT network.

FIG. 3 shows an example of a discovery process performed by a configuration management module for an updated CI in an IT network. At the monitoring operation 302, a configuration management module can monitor software code, logs, or network activity associated with a CI to determine that the CI has been updated in the IT network. For example, the configuration management module can determine that the CI is updated by comparing the software code to a previous version or a default version of the software code. In an example implementation, the configuration management module can search for values associated with a pre-determined number of key terms within the software code of the CI and the previous software code of the CI to determine whether the values have changed. If the configuration management module determines that the values associated with the key terms have changed, then the configuration management module can determine that the CI has been updated.

In another example implementation, the configuration management module can determine that the CI is updated by periodically comparing current log entries to previous log entries that occurred during the same time frame, but 24 hours previously. Machine learning can detect changes with key terms associated with logging data. For example, newer versions of web-services can have updated URI's, or a version value can be associated with the web-service metadata and detected during log generation as newer versions of web-services are released. If the configuration management module determines that the values associated with the key terms have changed, then the configuration management module can determine that the CI has been updated.

In yet another example implementation, the configuration management module can determine that the CI is updated by periodically scanning the IT network searching for changes to existing IT assets. The configuration management module can periodically scan the IT network looking for updates or changes to existing CI's. For example, newer versions of IT assets can be detected with sensors that monitor updated date/time stamps and version control systems and Change Management systems used to regulate release processes. If the configuration management module determines that the values associated with the key terms have changed, then the configuration management module can determine that the CI has been updated.

At the sending operation 304, upon determining that the CI has been updated, the configuration management module can send a message to the CMDB to update a previous version of the CI with the updated version of the CI.

III. CIs Removed from an IT Network

Figure 4:
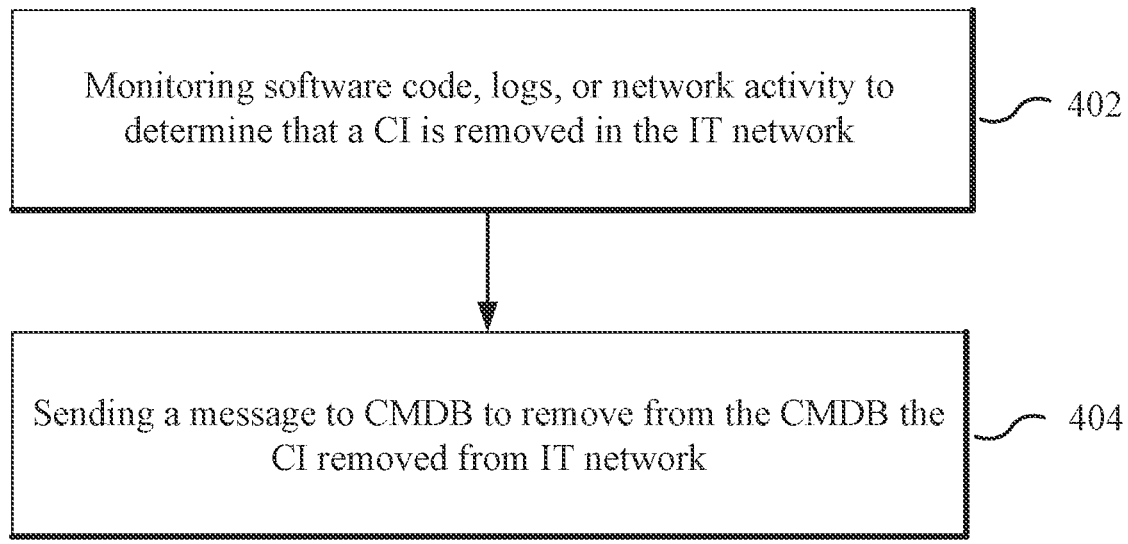
FIG. 4 shows an example discovery process performed by a configuration management module for a CI removed from an IT network.

FIG. 4 shows an example of a discovery process performed by a configuration management module for a CI removed from an IT network. At the monitoring operation 402, a configuration management module can monitor software code, logs, or network activity associated with a CI to determine that the CI has been removed from the IT network. In some embodiments, the configuration management module can determine that the CI is removed from the software code by comparing the software code to a previous version or a default version of the software code. For example, by determining that a value associated with a key term in the software code has been changed (e.g., a value of "0" to indicate that a CI has been disabled), the configuration module can determine that the CI has been removed from the IT network.

In an example implementation, the configuration management module can determine that the CI is removed by periodically comparing current log entries to previous log entries that occurred during the same time frame, but 24 hours previously. The configuration management module can employ machine learning to detect the absence of one or more key terms associated with logged data overtime of the CI. For example, if a web-service CI stops logging events for a period of time, then the configuration management module can determine, that the CI is no longer active. If the configuration management module determines that the CI's are no longer logging events for a period of time, then the configuration management module can determine that the CI can be removed.

At the removing operation 404, upon determining that the CI has been removed from the IT network, the configuration management module can send a message to the CMDB to remove from the CMDB the CI removed from the IT network.

Figure 5:
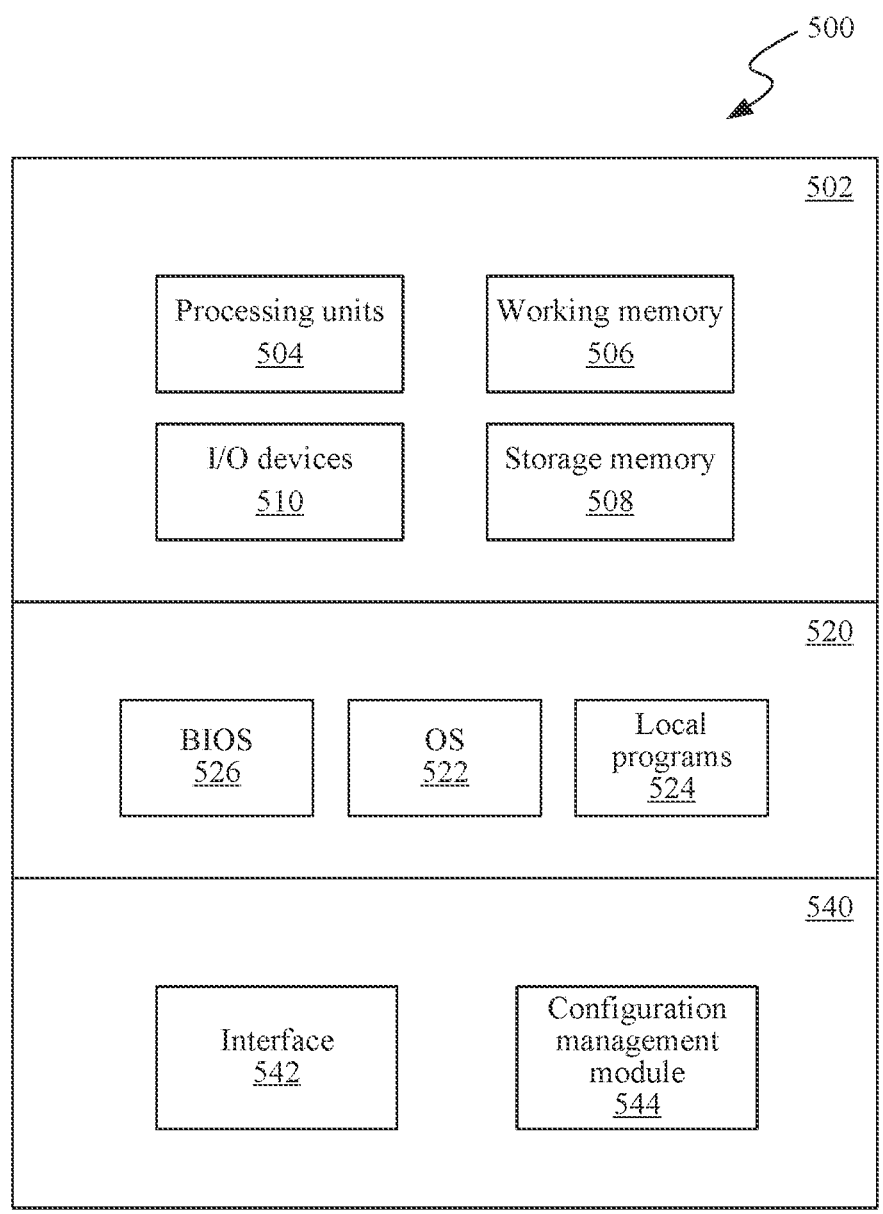
FIG. 5 is a block diagram illustrating components which, in some implementations, can be used in a system employing the disclosed technology.

FIG. 5 is a block diagram illustrating components which, in some implementations, can be used in a system employing the disclosed technology. The components 500 include hardware 502, general software 520, and specialized components 540. A system implementing the disclosed technology can use various hardware, including processing units 504 (e.g., CPUs, GPUs, APUs, etc.), working memory 506, storage memory 508, and input and output devices 510. Some or all of the components 500 can be implemented on a server, such as a CMDB server. For example, a memory may store instructions that upon execution by the processing units 504 configure the CMDB server to perform the operations described for the configuration management module 544 in FIGS. 1 to 4 and 6 and/or in the various embodiments described in this patent document.

General software 520 can include various applications, including an operating system 522, local programs 524, and a basic input output system (BIOS) 526. Specialized components 540 can be subcomponents of a general software application 520, such as local programs 524. Specialized components 540 can include a configuration management module 544. In some implementations, components 500 can be in a computing system that is distributed across multiple computing devices or can be an interface to a server-based application executing one or more of specialized components 540.

Figure 6:
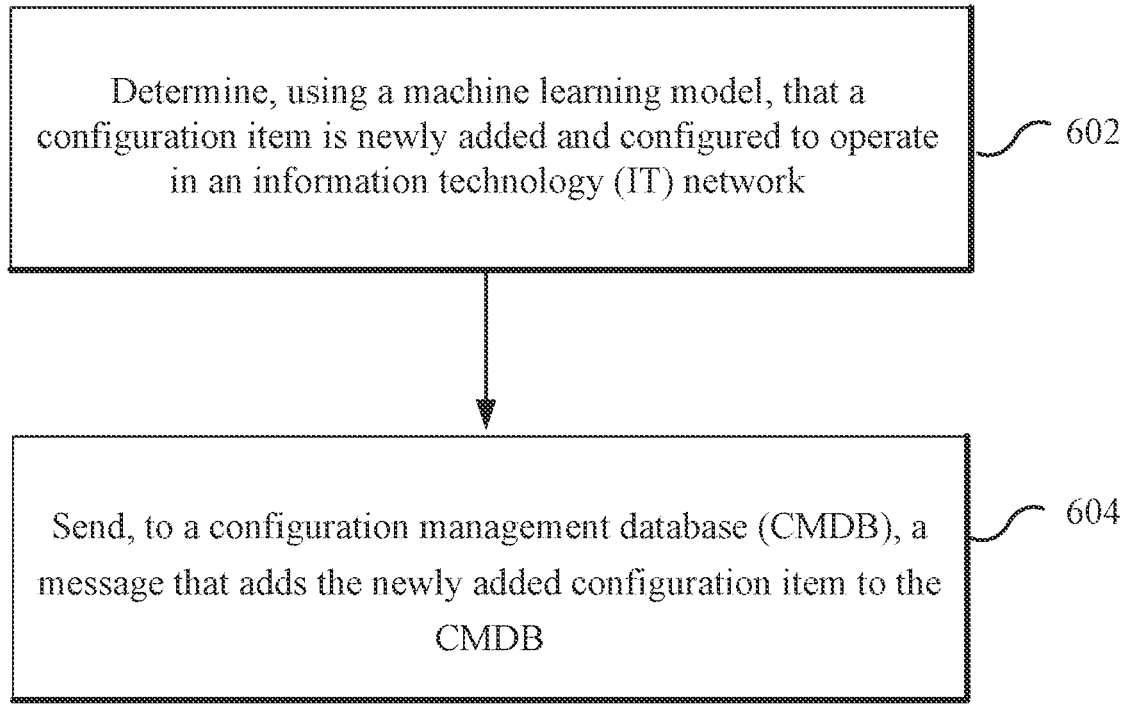
FIG. 6 shows an example flow diagram to detect changes in an IT network.

FIG. 6 shows a flow diagram of an example process of detecting changes in an IT network. At the determining operation 602, a configuration management module determines, using a machine learning model, that a configuration item is newly added and configured to operate in an information technology (IT) network. The configuration item describes a hardware component or a software component that is configured to operate in the IT network, The configuration management module can perform the determining operation 602 by parsing a software code or a log message associated with the configuration item and by identifying presence of one or more key terms within the software code or the log message. The presence of the one or more key terms indicate that the configuration item is newly added to the IT network, and the one or more key terms include a name of the configuration item or an identifier associated with a user of the configuration item At the sending operation 604, the configuration management module sends, to a CMDB, a message that instructs the CMDB to add the newly added configuration item in the CMDB.

In some embodiments, the method of FIG. 6 further includes the configuration management module determining that the configuration item is updated by comparing the software code to a previous version or a default version of the software code, and sending, to the CMDB, a second message that updates a previous version of the configuration item stored in the CMDB with the updated configuration item. In some embodiments, the method of FIG. 6 further includes the configuration management module determining that the configuration item is removed from the software code by comparing the software code to a previous version or a default version of the software code or by determining an absence of one or more terms from the log message associated with the configuration item, and sending, to the CMDB, a second (or third) message that removes the configuration item from the CMDB. In some embodiments, the configuration item includes a server, a database, a web service, a laptop, a networking device, a phone, or a virtual machine. In some embodiments, the one or more key terms are obtained from a training set maintained by the machine learning model. In some embodiments, the method of FIG. 6 further includes the configuration management module determining a presence of a relationship between the configuration item and a second configuration item; and sending, to a CMDB, a second (or fourth) message that indicates the relationship between the configuration item and the second configuration item.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
   identifying, using a machine learning model, one or more key terms within a software code associated with a first configuration item,
      wherein the one or more key terms indicate that the first configuration item is newly added to an information technology (IT) network or updated on the IT network;
   determining the first configuration item has a dependency relationship with a second configuration item; and
   sending a message to a configuration management database (CMDB), wherein the message instructs the CMDB to add the first configuration item to the CMDB or update the first configuration item in the CMDB,
      wherein the CMDB stores the first configuration item with information for the dependency relationship associated with the second configuration item.

2. The method of claim 1, further comprising:
   determining that the first configuration item is removed from the software code by comparing the software code to a previous version or a default version of the software code; and
   sending, to the CMDB, a second message that removes the first configuration item from the CMDB.

3. The method of claim 1, further comprising:
   sending, to the CMDB, a second message that indicates the dependency relationship between the first configuration item and the second configuration item.

4. The method of claim 1, further comprising:
   determining that the first configuration item is updated by comparing the software code to a previous version or a default version of the software code; and
   sending, to the CMDB, a second message that updates a previous version of the first configuration item stored in the CMDB with the updated configuration item.

5. The method of claim 1, further comprising:
   determining that the first configuration item is configured to operate in the IT network by parsing the software code associated with the first configuration item; and
   selecting the one or more key terms to search for in the software code based on a type of the first configuration item.

6. The method of claim 1, wherein the one or more key terms include a name of the first configuration item or an identifier associated with a user of the first configuration item.

7. The method of claim 1, wherein the one or more key terms are obtained from a training set maintained by the machine learning model.

8. A system comprising:
   one or more processors; and
   one or more memories storing instructions that, when executed by the one or more processors, cause the system to perform a process comprising:
      identifying, using a machine learning model, one or more key terms within a software code associated with a first configuration item,
         wherein the one or more key terms indicate that the first configuration item is newly added to an information technology (IT) network or updated on the IT network;
      determining the first configuration item has a dependency relationship with a second configuration item; and
      sending a message to a configuration management database (CMDB), wherein the message instructs the CMDB to add the first configuration item to the CMDB or update the first configuration item in the CMDB,
         wherein the CMDB stores the first configuration item with information for the dependency relationship associated with the second configuration item.

9. The system according to claim 8, wherein the process further comprises:

determining that the first configuration item is removed from the software code by comparing the software code to a previous version or a default version of the software code; and sending, to the CMDB, a second message that removes the first configuration item from the CMDB.

10. The system according to claim 8, wherein the process further comprises:

sending, to the CMDB, a second message that indicates the dependency relationship between the first configuration item and the second configuration item.

11. The system according to claim 8, wherein the process further comprises:

determining that the first configuration item is updated by comparing the software code to a previous version or a default version of the software code; and sending, to the CMDB, a second message that updates a previous version of the first configuration item stored in the CMDB with the updated configuration item.

12. The system according to claim 8, wherein the process further comprises:

determining that the first configuration item is configured to operate in the IT network by parsing the software code associated with the first configuration item; and selecting the one or more key terms to search for in the software code based on a type of the first configuration item.

13. The system according to claim 8, wherein the one or more key terms include a name of the first configuration item or an identifier associated with a user of the first configuration item.

14. The system according to claim 8, wherein the one or more key terms are obtained from a training set maintained by the machine learning model.

15. A non-transitory computer-readable medium storing instructions that, when executed by a computing system, cause the computing system to perform operations comprising:

identifying, using a machine learning model, one or more key terms within a software code associated with a first configuration item, wherein the one or more key terms indicate that the first configuration item is newly added to an information technology (IT) network or updated on the IT network;

determining the first configuration item has a dependency relationship with a second configuration item; and sending a message to a configuration management database (CMDB), wherein the message instructs the CMDB to add the first configuration item to the CMDB or update the first configuration item in the CMDB, wherein the CMDB stores the first configuration item with information for the dependency relationship associated with the second configuration item.

16. The non-transitory computer-readable medium of claim 15, wherein the operations further comprise:

determining that the first configuration item is removed from the software code by comparing the software code to a previous version or a default version of the software code; and sending, to the CMDB, a second message that removes the first configuration item from the CMDB.

17. The non-transitory computer-readable medium of claim 15, wherein the operations further comprise:

sending, to the CMDB, a second message that indicates the dependency relationship between the first configuration item and the second configuration item.

18. The non-transitory computer-readable medium of claim 15, wherein the operations further comprise:

determining that the first configuration item is updated by comparing the software code to a previous version or a default version of the software code; and sending, to the CMDB, a second message that updates a previous version of the first configuration item stored in the CMDB with the updated configuration item.

19. The non-transitory computer-readable medium of claim 15, wherein the operations further comprise:

determining that the first configuration item is configured to operate in the IT network by parsing the software code associated with the first configuration item; and selecting the one or more key terms to search for in the software code based on a type of the first configuration item.

20. The non-transitory computer-readable medium of claim 15, wherein the one or more key terms include a name of the first configuration item or an identifier associated with a user of the first configuration item, and wherein the one or more key terms are obtained from a training set maintained by the machine learning model.

* * * * *